United States Patent [19]

Matsuda et al.

[11] Patent Number: 5,652,476

[45] Date of Patent: *Jul. 29, 1997

[54] ANTIREFLECTION FILM AND DISPLAY APPARATUS COMPRISING THE SAME

[75] Inventors: Hidemi Matsuda, Fukaya; Takeo Itou, Kumagaya; Hisashi Chigusa, Fukaya; Michiyo Abe, Tomioka, all of Japan

[73] Assignee: Kabushiki Kaisha Toshiba, Kawasaki, Japan

[*] Notice: The term of this patent shall not extend beyond the expiration date of Pat. No. 5,444,329.

[21] Appl. No.: 514,217

[22] Filed: Aug. 11, 1995

Related U.S. Application Data

[63] Continuation of Ser. No. 145,849, Nov. 5, 1993, Pat. No. 5,444,329.

[30] Foreign Application Priority Data

Nov. 6, 1992 [JP] Japan .................................. 4-296731

[51] Int. Cl.$^6$ .......................... H01J 29/88; H01J 31/00; H01J 5/16; H01J 61/40
[52] U.S. Cl. .................... 313/478; 313/112; 313/479; 359/590
[58] Field of Search .................. 313/110–112, 478–479; 359/586, 587, 588, 590

[56] References Cited

U.S. PATENT DOCUMENTS

| | | |
|---|---|---|
| 5,051,652 | 9/1991 | Isomura . |
| 5,153,481 | 10/1992 | Matsuda et al. . |
| 5,216,542 | 6/1993 | Szczyrbowski et al. . |
| 5,228,558 | 7/1993 | Nöthe ............................ 313/479 X |
| 5,243,255 | 9/1993 | Iwasaki . |
| 5,281,893 | 1/1994 | Matsuda et al. ................... 313/478 |
| 5,288,558 | 2/1994 | Nöthe . |
| 5,291,097 | 3/1994 | Kawamura et al. . |
| 5,444,329 | 8/1995 | Matsuda et al. ................... 313/479 |
| 5,520,855 | 5/1996 | Ito et al. ........................... 252/582 |

FOREIGN PATENT DOCUMENTS

| | | |
|---|---|---|
| 0112418 | 7/1984 | European Pat. Off. . |
| 0445686 | 9/1991 | European Pat. Off. . |
| 0519503 | 12/1992 | European Pat. Off. . |
| 0585819 | 3/1994 | European Pat. Off. . |
| 3261047 | 11/1991 | Japan . |
| 4-67545 | 3/1992 | Japan . |
| 4334853 | 11/1992 | Japan . |

OTHER PUBLICATIONS

Mouchart et al, "Thin Film Optical Coatings. 7: Two–layer Coatings Close to Antireflection", Applied Optics, vol. 18, No. 8, Apr. 15, 1979, pp. 1226–1232.

Azzam et al, "Antireflecting and Polarizing Transparent Bilayer Coatings on Absorbing Substrates at Oblique Incidence", Applied Optics, vol. 24, No. 4, Feb. 15, 1985, pp. 519–525.

Murphy, "High–Contrast Optical Bandpass Filter", IBM Technical Disclosure Bulletin, vol. 16, No. 3, Aug. 1973, pp. 745–746.

Search Report dated Jun. 2, 1995.

*Primary Examiner*—Sandra L. O'Shea
*Assistant Examiner*—Mark Haynes
*Attorney, Agent, or Firm*—Cushman Darby & Cushman, IP Group of Pillsbury Madison & Sutro, LLP

[57] ABSTRACT

The present invention is directed to an antireflection film having a multilayer structure in which an antireflection multi-layer film including at least two thin films is formed on a substrate, wherein at least one of the thin films contains a coloring agent. The antireflection multi-layer film absorbs light of an entire range of wavelength of 400–700 nm, and the reflectance of the antireflection multi-layer film with regard to the wavelength, light of which this antireflection multi-layer film can absorb, is smaller than the reflectance of the substrate. The antireflection film can be applied to a cathode ray tube or a light-transmitting display substrate of a display apparatus such as a liquid crystal display apparatus for the purpose of effectively avoiding reflection of external light.

22 Claims, 7 Drawing Sheets

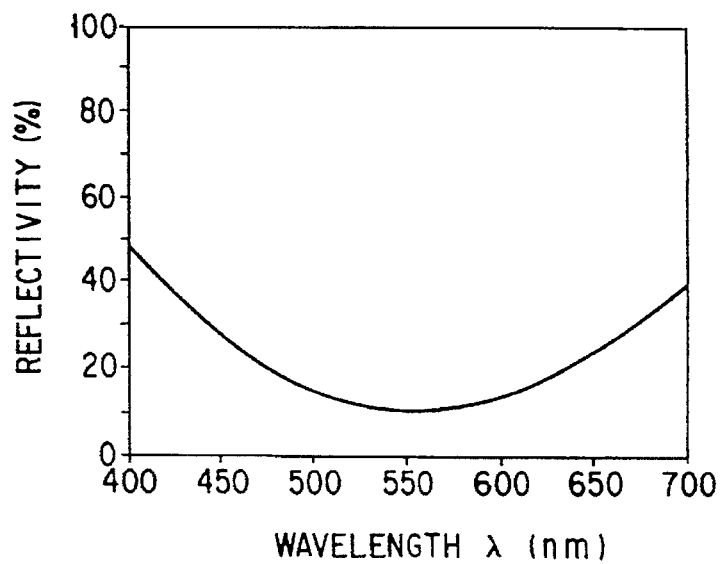
F I G. 4A
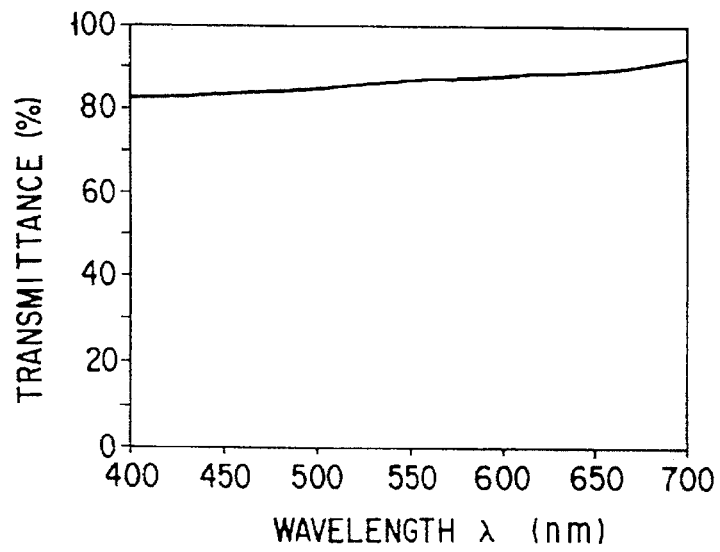
F I G. 4B
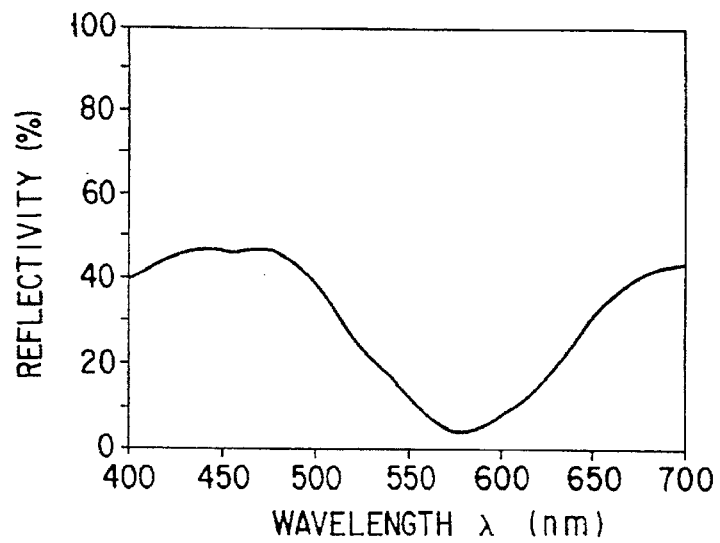
F I G. 5A

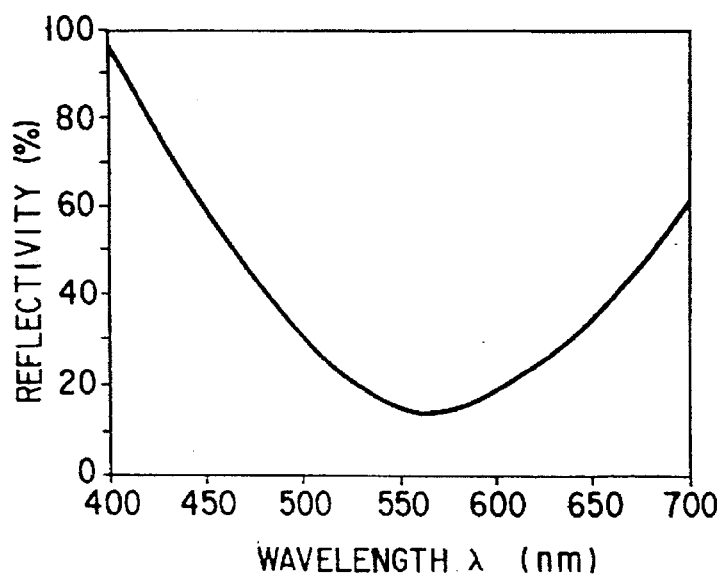
F I G. 7A
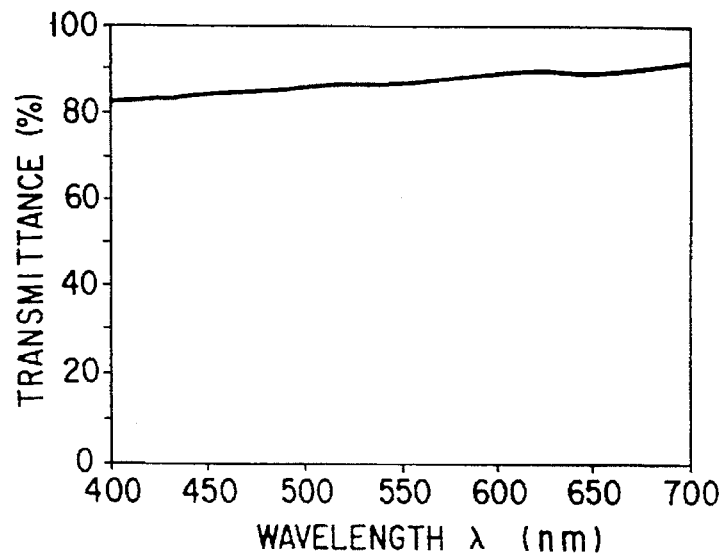
F I G. 7B
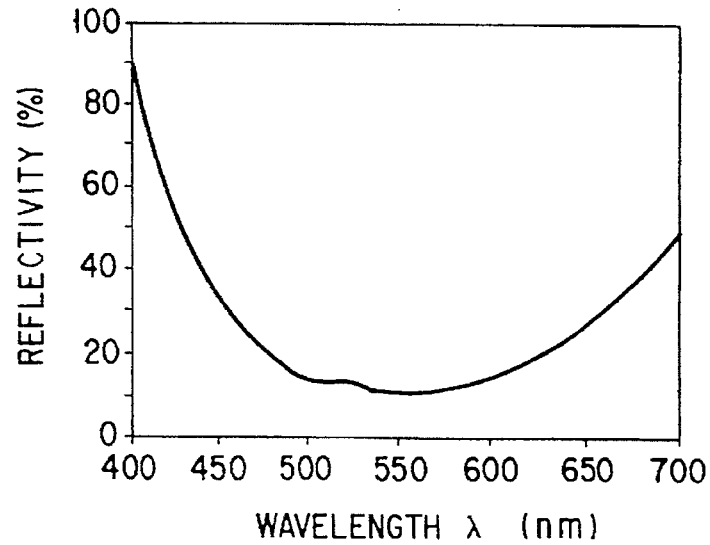
F I G. 8A

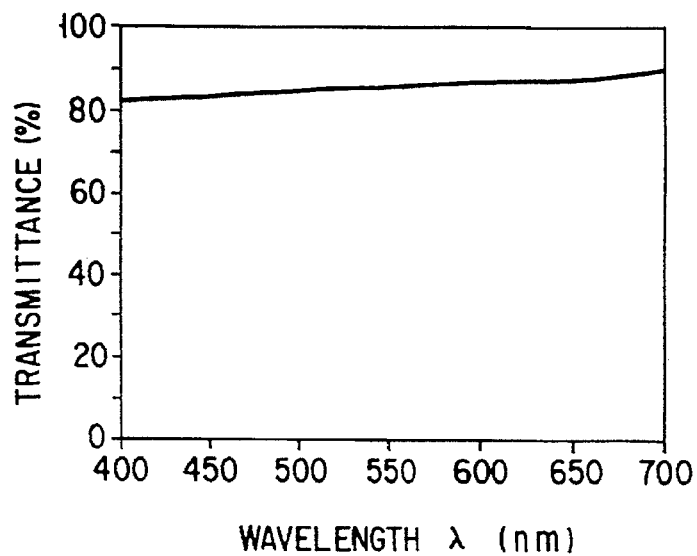
F I G. 8B
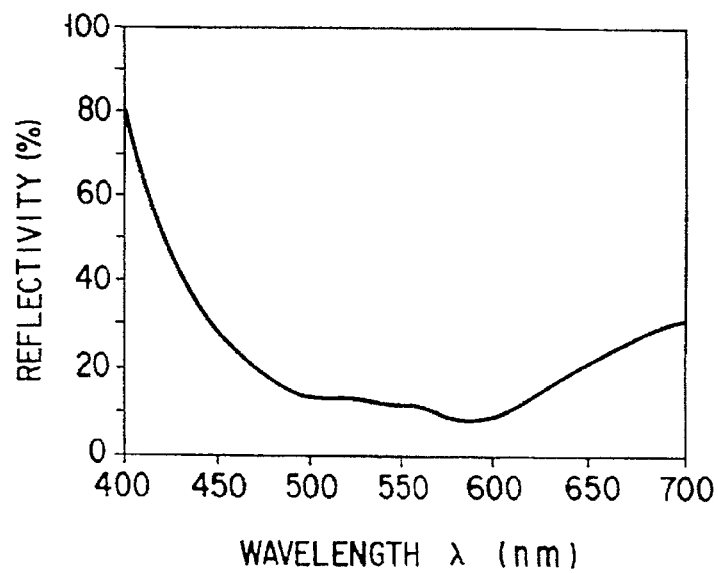
F I G. 9A
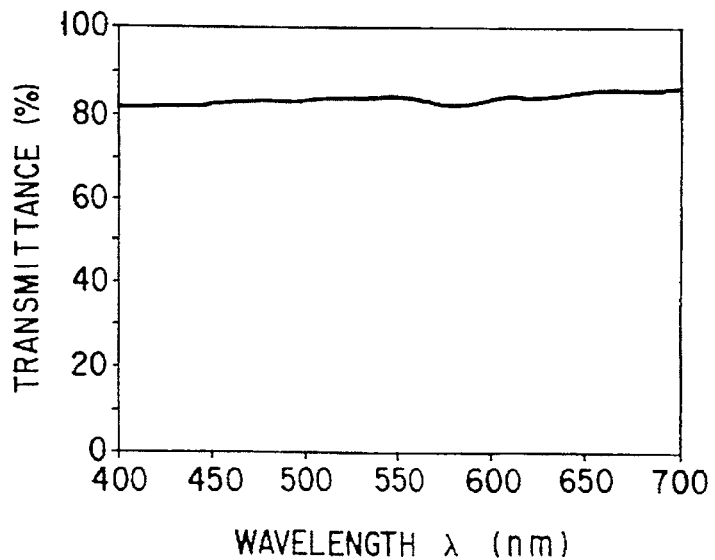
F I G. 9B

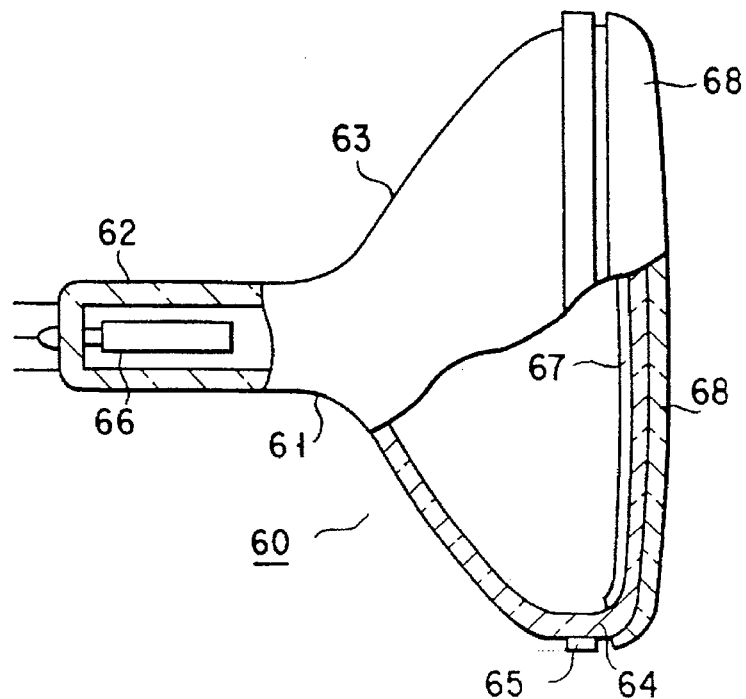
F I G. 10
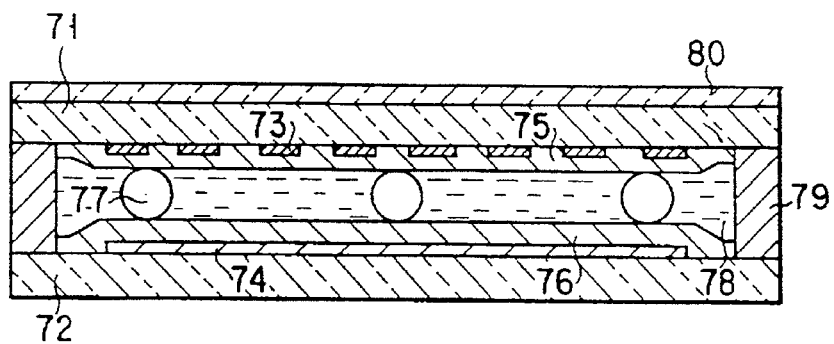
F I G. 11

ANTIREFLECTION FILM AND DISPLAY APPARATUS COMPRISING THE SAME

This is a continuation of U.S. Pat. No. 5,444,329, which issued from application Ser. No. 08/145,849, filed Nov. 5, 1993.

BACKGROUND OF THE INVENTION

1. Field of the Invention

The present invention relates to an antireflection film for effectively preventing external reflection, and a display apparatus having the antireflection film.

2. Description of the Related Art

A glass plate is generally used as a substrate for a window glass, a show window, or the display surface of a display device. The glass plate sometimes causes specular reflection of ambient light such as daylight or light from lighting units. For this reason, a reflection often occurs, resulting in deterioration in transparency. Especially in a display apparatus, if specular reflection occurs on the display surface, an image to be displayed on the display surface overlaps an image of a light source, a scene, and the like to cause considerable deterioration in image quality.

In a conventional method of preventing such reflection, a single-layer or multilayer optical film, i.e., an antireflection film, is formed on the substrate surface to prevent external reflection by using interference of light.

One well-known antireflection film is referred to as a ¼-wave film. This ¼-wave film will be described below.

When external reflection is to be prevented by a single-layer antireflection film, the following non-reflection conditions must be satisfied, provided that the refractive index of air is represented by $n_0$; the refractive index of the thin film, $n_1$; the refractive index of the substrate, $n_2$; the thickness of the thin film, d; and the wavelength of light which is to be prevented from reflecting, $\lambda$.

$$n_1 d = \lambda/4 \quad (1)$$

$$n_1^2 = n_0 n_2 \quad (2)$$

Since the thickness of the thin film which satisfies these equations (1) and (2) corresponds to ¼ the wave-length of the light which is to be prevented from reflecting, the film is called a ¼-wave film.

When the equations (1) and (2) are satisfied, the reflection of the light having a wavelength of $\lambda$ can be reduced to zero. When a glass substrate is used, $n_2$ is 1.52, and the refractive index $n_0$ of the air is 1.00. Therefore, the refractive index $n_1$ of the thin film must be set to be 1.23. The most practicable low-refractive-index material of currently known thin film materials is $MgF_2$. The refractive index of $MgF_2$ is 1.38, which is larger than the refractive index ($n_1$=1.23) defined by the non-reflection conditions. For this reason, it is impossible to completely prevent external reflection by using only a single-layered low-refractive-index thin film.

Under the circumstances, attempts have been made to prevent reflection by forming a two-layer antireflection film consisting of lower and upper layers formed on a substrate. With this film, the following non-reflection conditions must be satisfied, provided that the refractive index of air is represented by $n_0$; the refractive index of the upper layer, $n_3$; the refractive index of the lower layer, $n_4$; the refractive index of the substrate, $n_2$; the thickness of the upper layer, $d_1$; the thickness of the lower layer, $d_2$; and the wavelength of light which is to be prevented from reflecting, $\lambda$.

$$n_3 d_1 = \lambda/4 \quad (3)$$

$$n_4 d_2 = \lambda/4 \quad (4)$$

$$n_2 n_3^2 = n_0 n_4^2 \quad (5)$$

According to these equations (3), (4), and (5), if the substrate is a glass plate, since $n_2$=1.52 and $n_0$=1.00, external reflection can be prevented by selecting materials for the lower and upper layers such that a refractive index ratio $n_4/n_3$ is set to be 1.23.

It is known that an antireflection film having not only two layers, but three or more layers may be used for controlling the reflection in a wide range. More specifically, the thickness of an antireflection film is determined by the wavelength of the light. Therefore, theoretically, by use of a multilayer having an N-number of layers, the reflectance relating to each of an N-number of wavelengths can be decreased.

Published Unexamined Japanese Patent Application No. 3-261047 discloses a conventional method, wherein a two-layer antireflection film is used, and the refractive index of the lower layer is controlled by adjusting the porosity thereof. Further, it is proposed to add pigments to the two-layer antireflection film so that it will have an optical filter effect.

As described, it is known that a multilayer antireflection film should be formed on a glass substrate surface in order to reduce external reflection.

Regardless of its type, the conventional multilayer antireflection film has a structure in which materials having high and low refractive indices are formed on a glass substrate. This is because the refractivity of the multilayer film had to be set at a certain value in order to satisfy the non-reflection conditions for a specific wavelength. However, there are only a limited number of practicable low- and high-refractivity materials, and appropriate combinations must be selected from the limited number of the materials. Examples of the high-refractivity material are $TiO_2$, $ZrO_2$, $BaO$, $SnO_2$; examples of the low-refractivity type are $MgF_2$, $SiO_2$, and $SnO_2$. The selection must be made from these materials.

In addition, when the layers of the multilayer film are made of different materials as described above, the problem of adherence between layers arises. As a result, the conditions for forming a film must be complicatedly restricted.

SUMMARY OF THE INVENTION

The present invention has been proposed in consideration of the above-described problem, and an object thereof is to provide an antireflection film having a multilayer structure.

Another object of the present invention is to provide a display device comprising such an antireflection film on its display surface.

According to the present invention, there is provided an antireflection film having a multilayer structure in which an antireflection multilayer film including at least two thin films is formed on a substrate, wherein at least one of the thin films contains a coloring material and wherein the antireflection multilayer film absorbs light of an entire range of wavelength of 400–700 nm, and the reflectance of the antireflection multilayer film with regard to that wavelength, light of which the antireflection multilayer film can absorb, is smaller than the reflectance of the substrate.

Further, according to the present invention, there is provided a display device comprising a light-transmissible display substrate and an antireflection multilayer film including at least two thin films laminated on the substrate, wherein at least one of the thin films contains a pigment and wherein the antireflection multilayer film absorbs light of an entire range of wavelength of 400–700 nm, and the reflectance of the antireflection multilayer film with regard to that wave-length, light of which this antireflection multilayer film can absorb, is smaller than the reflectance of the substrate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4A is a graph showing the spectral reflectance of an antireflection multilayer film according to Example 4;

FIG. 4B is a graph showing the spectral transmittance characteristics of an antireflection multilayer film according to Example 4;

FIG. 5A is a graph showing the spectral reflectance of an antireflection multilayer film according to Example 5;

FIG. 7A is a graph showing the spectral reflectance of an antireflection multilayer film according to Example 7;

FIG. 7B is a graph showing the spectral transmittance characteristics of an antireflection multilayer film according to Example 7;

FIG. 8A is a graph showing the spectral reflectance of an antireflection multilayer film according to Example 8;

FIG. 8B is a graph showing the spectral transmittance characteristics of an antireflection multilayer film according to Example 8;

FIG. 9A is a graph showing the spectral reflectance of an antireflection multilayer film according to Example 9;

FIG. 9B is a graph showing the spectral transmittance characteristics of an antireflection multilayer film according to Example 9;

FIG. 10 is a partial sectional view showing a brief structure of a cathode ray tube according to Example 10; and FIG. 11 is a sectional view showing a brief structure of a liquid crystal apparatus according to Example 11.

DETAILED DESCRIPTION OF THE PREFERRED EMBODIMENTS

Figure 1A:
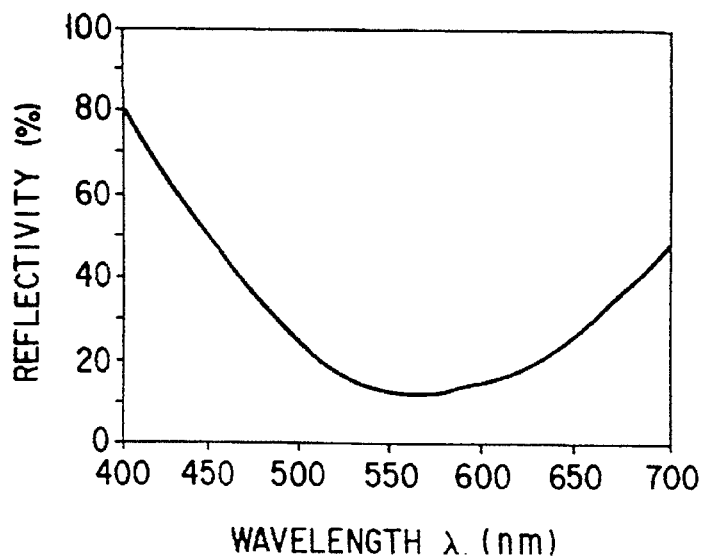
FIG. 1A is a graph showing the spectral reflectance of an antireflection multilayer film according to Example 1.

According to the present invention, at least one layer of the antireflection multilayer film contains a coloring material. Generally, a coloring material selectively absorbs light having a particular wavelength. Thin films containing such pigments were examined in detail, and the inventors have discovered the following.

Specifically, the refractive index of the thin film tends to increase in the range of wavelength of light of which the coloring material absorbs whereas the refractive index tends to decrease outside this range of wavelength. Further, when an antireflection multi-layer film is formed by use of such thin films, the antireflection effect is significant in the range of wavelength in which the refractive index tends to increase, i.e. the range of wavelength which the coloring material absorbs. Consequently, the reflectance of the antireflection multilayer film decreases in the wavelength range which substantially corresponds to the range of the wavelength which the coloring material absorbs. Therefore, in the case where the antireflection effect is required in the entire range of wavelength of visible light, the refractive index of the antireflection multilayer film must be increased in the entire range of wavelength of visible light. As a result, it is necessary that the antireflection multilayer film absorbs the light in the entire range of wavelength of visible light.

According to another result of the examination, in order for the refractive index to tend to increase in accordance with an increase in wavelength, the transmisitivity must be 95% or less, and in order to have an increase in refractive index to such an extent that a sufficient result can be obtained, the transmisitivity must be 90% or less, more preferably, 85% or less.

Based on such findings, in the antireflection film having a multilayer structure according to the present invention, it is possible to avoid the reflection of visible light to the maximum degree by adding a coloring material which absorbs light in the entire range of wavelength, 400–700 nm, to the films.

A usual multilayer antireflection film has a structure in which low- and high-refractive index layers are alternately laminated to have a low-refractive index layer at the outer surface. In a preferred embodiment of the present invention, it is possible to avoid the reflection of visible light effectively by adding a coloring material to a high-refractive index layer. The refractive index of a film varies in the range of wavelength which the coloring material absorbs, as mentioned above, and therefore the refractive index can be set so as to satisfy the non-reflection conditions for the antireflection multilayer film.

Therefore, it is preferable that at least one of even number-th layers, counting from the outermost layer of the multilayer antireflection film, contains a coloring material.

As described, the adjustment of the refractive index is conducted by the coloring material which has a certain absorbing characteristic. Therefore, it is no longer necessary to form each layer of the multilayer film of different materials such as low- and high-refractory types. The layers of the multilayer film can be made of the same material, thereby increasing the adherence between layers.

Further, by using materials having different refractive indices, for examples, $SiO_2$ and $TiO_2$ as low-and high-refractive materials, respectively, and further by adding a coloring material to the $TiO_2$ layer, the antireflection effect can be improved.

Examples of the materials for the practicable thin film in the present invention are $SiO_2$, $TiO_2$, $ZrO_2$, $TaO_5$, and $Al_2O_3$. The layers of the multilayer thin film may be made of different materials or the same material. when the same material is used, the adherence between layers can be improved as mentioned above. However, in order to obtain characteristics of the multilayer structure, the layers should be differentiated from each other in the following ways. The coloring material should be contained in some layers, and are not in other layers, the type of coloring material used should differ from one layer to another, and the contents of the coloring material should be different from one layer to another.

When different materials are used for the layers of the thin film, it is preferable that the uppermost layer is made of a low-refractive material.

In the present invention, black coloring materials including carbon black and graphite can be used as coloring materials. Besides these coloring materials, almost all available pigments can be used. Examples of the organic pigment are: azo-based yellow and red pigments such as Benzidine Yellow and Carmine condensation pigments such as perylene, perylone, dioxazine, thioindigo, isoindolinone, quinophthalon, and quinacridone, and phthalocyanine-based pigments. Examples of the inorganic pigment are: titanium white, red iron oxide, chrome yellow, and cobalt blue. The pigments must be mixed such that the mixture has an absorbance of 5% or more, preferable 10% or more, throughout the entire range of wavelength of visible light.

As described above, the coloring material can be used in various ways. For example, a coloring material which absorbs light in the entire range of wavelength of visible light, such as carbon black or graphite, can be used solely, or such a coloring material can be used in combination with other coloring materials. Also, it is possible that a yellow or red coloring material which absorbs the light in a wave-length of 500 nm or 600 nm or less, such as Benzine Yellow or Carmine FB, is combined with a blue coloring material which absorbs the light in a wavelength of 500 nm or more, such as Heliogen blue EP-7.

It is preferable that coloring material which can be subjected to the above-mentioned combinations be of the organic type because of its variety. Further, in order to keep a certain transparency of the film, the particle sizes of these coloring materials should preferably be no more than 300 nm. In general, in order to obtain a certain transparency, the particle of a coloring material should be ½ or less of the wave-length λ, and therefore the wavelength should be no more than 200 nm in the case of visible light. This is because the transparency is likely to deteriorate due to the scattering of light which is caused by a pigment having a large particle size. According to the present invention, since coloring materials are confined in the film, the difference of refractive index between coloring material and film material is smaller than that of refractive index between coloring material and the air. Consequently, the particle size of the coloring material may be allowable up to 300 nm to maintain the transparency of the film. Further, in order to prevent equation from a porous film and ensure sufficient resistance to light, a pigment having a particle size of nm or more is preferably used. More preferably, the particle size of a pigment should be 5–200 nm.

The amounts of pigment contained in thin films may differ greatly from one another, depending on the type of pigment, and therefore it is not easy to set a range of contents.

The antireflection multilayer film of the present invention can be applied to those apparatuses in which an image is observed through a display substrate, such as cathode ray tube and liquid crystal display apparatus.

Examples of the present invention will now be described in detail.

EXAMPLE 1

(1) Preparation of lower layer forming solution

First, a solution A having the following composition was prepared as a lower-layer forming solution.

| A: $Si(OC_2H_5)_4$ silicon tetraethoxide | 1.0 wt % |
|---|---|
| pigment dispersion 1 | 6.2 wt % |
| $HNO_3$ nitric acid | 0.1 wt % |
| water | 0.5 wt % |
| IPA (isopropylalcohol) | balance |

In this case, the pigment dispersion 1 was obtained by dispersing carbon black (pigment 1) having an average particle size of 100 nm in isopropylalcohol at 2.4 wt %. The mixed solution prepared to have the above composition A was agitated for about one hour to cause a reaction, thus preparing a lower layer forming solution.

(2) Preparation of upper layer forming solution

A solution B having the following composition was prepared as a lower-layer forming solution.

| B: $Si(OC_2H_5)_4$ silicon tetraethoxide | 1.0 wt % |
|---|---|
| $HNO_3$ (nitric acid) | 0.1 wt % |
| water | 0.5 wt % |
| IPA (isopropylalcohol) | balance |

After the mixed solution prepared to have the above composition B, the solution was agitated for about one hour to cause a reaction, thus preparing a upper layer forming solution.

(3) Formation of antireflection multilayer film

The above-described lower layer forming solution was coated on a glass substrate having a refractive index of 1.52 by dip coating method, and was dried at 150° C. for 5 minutes to form a lower layer having a thickness of about 0.1 μm. Subsequently, the upper layer forming solution was coated on the lower layer, and was calcined in an atmosphere of 180° C. for 10 minutes to form an upper layer having a thickness of about 0.1 μm. The composition of each layer of the two-layer antireflection film was as follows.

| Lower layer | $SiO_2$ | 66 wt % |
|---|---|---|
|  | pigment 1 (carbon black) | 34 wt % |
| Upper layer | $SiO_2$ only |  |

Figure 1B:
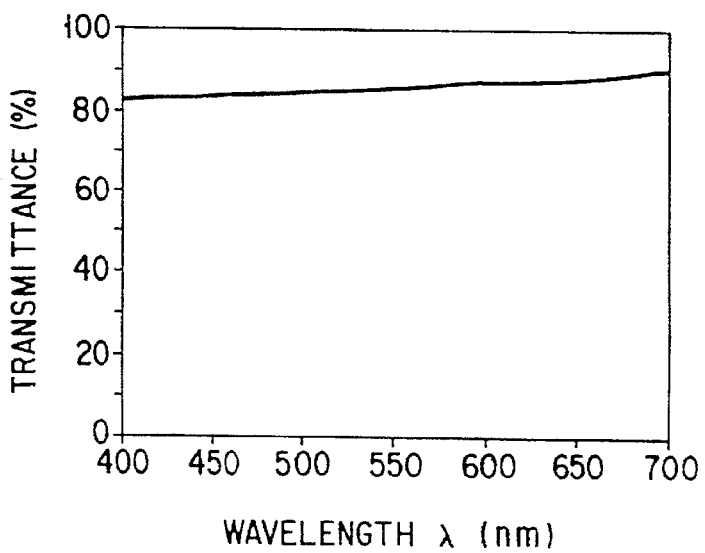
FIG. 1B is a graph showing the spectral transmittance characteristics of an antireflection multilayer film according to Example 1.

The spectral reflectance and spectral transmittance of the two-layer antireflection film obtained in this manner were measured, and the results were as shown in FIG. 1A and FIG. 1B. It should be noted that the spectral reflectance of the antireflection film was measured by MCPD-1000 available from Otsuka Electronics k.k. A halogen lamp was used as a light source to perform measurement at an incident angle of 0°, and the reflectance of a portion of the substrate on which no antireflection film was formed was assumed to be 100%.

Also, the spectral transmittance was measured by a spectrocolorimeter CM-1000 available from MINOLTA CAMERA CO., LTD. The measurement was performed on the sample which was placed on a white board. The measurement value was expressed by the square root of the ratio of the value of the antireflection multilayer film to the value of a portion on which no antireflection multilayer film was formed.

As is clear from FIG. 1A and FIG. 1B, the antireflection film of this embodiment exhibited an excellent antireflection effect.

EXAMPLE 2

(1) Preparation of lower layer forming solution

First, a solution C having the following composition was prepared as a lower layer forming solution.

| C: $Si(OC_2H_5)_4$ silicon tetraethoxide | 1.0 wt % |
|---|---|
| pigment dispersion 2 | 8.4 wt % |
| $HNO_3$ (nitric acid) | 0.1 wt % |
| water | 0.5 wt % |
| IPA (isopropylalcohol) | balance |

In this case, the pigment dispersion 2 was obtained by dispersing pigment 1 (carbon black) having an average particle size of about 100 nm, Heliogen blue EP-7S as pigment 2, and perylene-based violet as pigment 3, in isopropylalcohol at 1.71, 0.34, and 0.34 wt %, respectively. The mixed solution prepared to have the above composition C was agitated for about one hour to cause a reaction, thus preparing a lower layer forming solution.

(2) Formation of antireflection film

By use of the solution B of Example 1 as an upper layer forming solution, an antireflection film was formed on a glass substrate. The coating method, the conditions, and the film thickness were as in Example 1. The composition of each layer of the two-layer antireflection film thus formed was as follows.

| Lower layer | $SiO_2$ | 58.8 wt % |
|---|---|---|
| | pigment 1 | 29.4 wt % |
| | pigment 2 | 5.9 wt % |
| | pigment 3 | 5.9 wt % |
| Upper layer | $SiO_2$ only | |

Figure 2A:
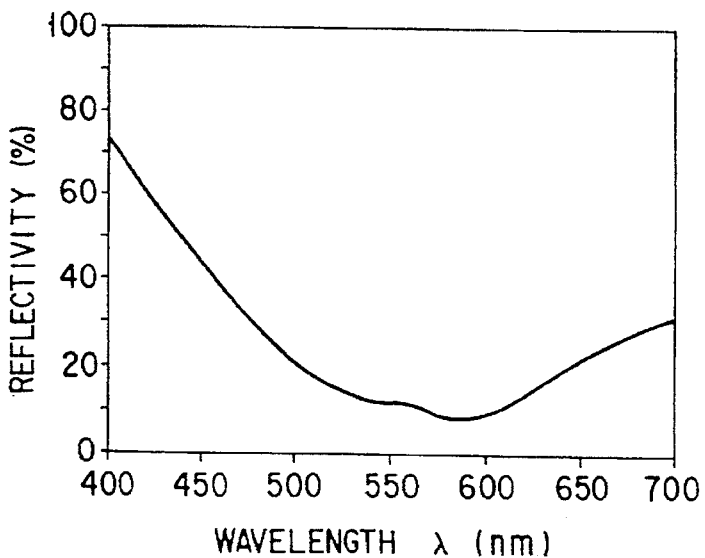
FIG. 2A is a graph showing the spectral reflectance of an antireflection multilayer film according to Example 2.
Figure 2B:
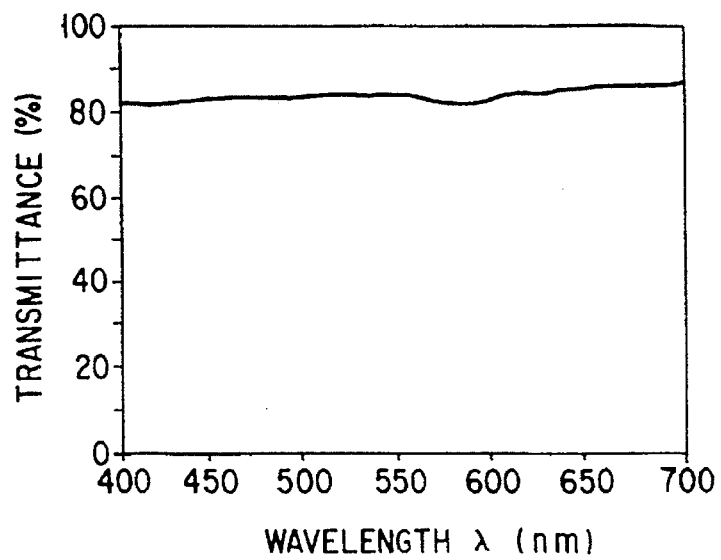
FIG. 2B is a graph showing the spectral transmittance characteristics of an antireflection multilayer film according to Example 2.

The spectral reflectance and spectral transmittance of the two-layer antireflection film obtained in this manner were measured, and the results were as shown in FIG. 2A and FIG. 2B. As is clear from FIG. 2A and FIG. 2B, the antireflection multilayer film of this embodiment exhibited an excellent antireflection effect, as in the case of the film of Example 1.

EXAMPLE 3

(1) Preparation of lower layer forming solution

First, a solution D having the following composition was prepared as a lower layer forming solution.

| D: $Si(OC_2H_5)_4$ silicon tetraethoxide | 1.0 wt % |
|---|---|
| pigment dispersion 3 | 9.6 wt % |
| $HNO_3$ nitric acid | 0.1 wt % |
| water | 0.5 wt % |
| IPA (isopropylalcohol) | balance |

In this case, the pigment dispersion 3 was obtained by dispersing pigments 2 and 3 each having an average particle size of about 100 nm, dioxadine-based violet as pigment 4, and isoindolinone-based yellow as pigment 5, in isopropylalcohol at 0.6 wt % respectively. The mixed solution prepared to have the above composition D was agitated for about one hour to cause a reaction, thus preparing a lower layer forming solution.

(2) Formation of antireflection multilayer film

By use of the solution B of Example 1 as an upper layer forming solution, an antireflection multilayer film was formed on a substrate. The coating method, the conditions, and the film thickness were similar to those of Example 1. The composition of each layer of the two-layer antireflection film thus formed was as follows.

| Lower layer | $SiO_2$ | 55.6 wt % |
|---|---|---|
| | pigment 2 | 11.1 wt % |
| | pigment 3 | 11.1 wt % |
| | pigment 4 | 11.1 wt % |
| | pigment 5 | 11.1 wt % |
| Upper layer | $SiO_2$ only | |

Figure 3A:
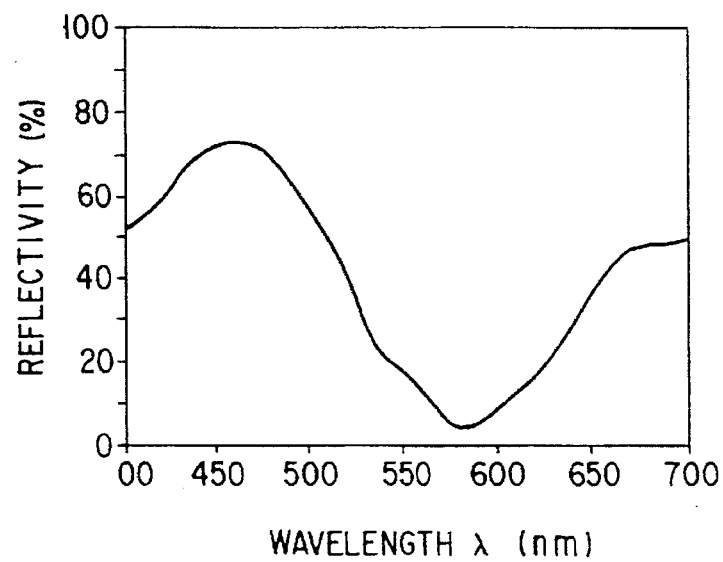
FIG. 3A is a graph showing the spectral reflectance of an antireflection multilayer film according to Example 3.
Figure 3B:
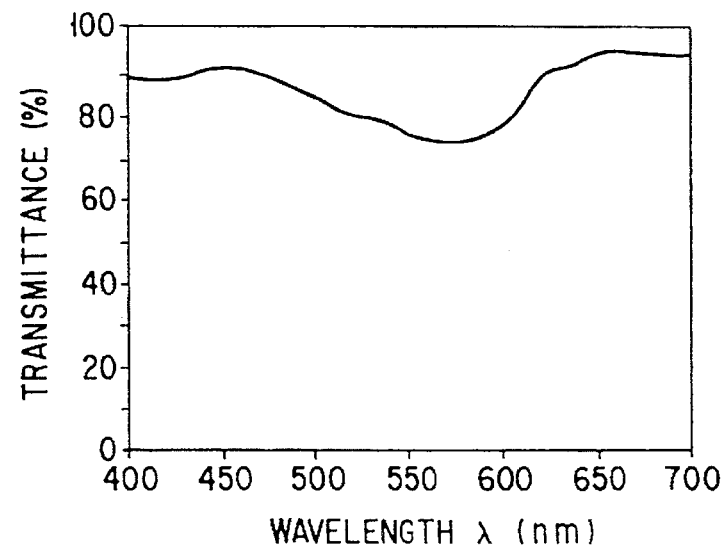
FIG. 3B is a graph showing the spectral transmittance characteristics of an antireflection multilayer film according to Example 3.

The spectral reflectance and spectral transmittance of the two-layer antireflection film obtained in this manner were measured, and the results were as shown in FIG. 3A and FIG. 3B. As is clear from the results, the antireflection film of this example exhibited an excellent antireflection effect, as in the case of the film of Example 1.

EXAMPLE 4

(1) Preparation of lower layer forming solution

First, a solution E having the following composition was prepared as a lower layer forming solution.

| E: $Ti(OC_3H_7)_4$ titanium tetraisopropoxide | 1.0 wt % |
|---|---|
| pigment dispersion 1 | 6.2 wt % |
| pentyl alcohol | 5.0 wt % |
| IPA (isopropylalcohol) | balance |

In this case, the pigment dispersion 1 used was the same as that of Example 1. The mixed solution prepared to have the above composition E was agitated for about one hour to cause a reaction, thus preparing a lower layer forming solution.

(2) Formation of antireflection multilayer film

By use of the solution B of Example 1 as an upper layer forming solution, an antireflection film was formed on a glass substrate. The coating method, the conditions, and the film thickness were as in Example 1. The composition of each layer of the two-layer antireflection film thus formed was as follows.

| Lower layer | TiO$_2$ | 65 wt % |
| --- | --- | --- |
| | pigment 1 | 35 wt % |
| Upper layer | SiO$_2$ only | |

The spectral reflectance and spectral transmittance of the two-layer antireflection film obtained in this manner were measured, and the results were as shown in FIG. 4A and FIG. 4B. As is clear from the results, the antireflection film of this example exhibited an excellent antireflection effect, as in the case of the film of Example 1.

EXAMPLE 5

(1) Preparation of lower layer forming solution

First, a solution F having the following composition was prepared as a lower layer forming solution.

| F: | Ti(OC$_3$H$_7$)$_4$ titanium tetraisopropoxide | 1.0 wt % |
| --- | --- | --- |
| | pigment dispersion 3 | 9.6 wt % |
| | pentyl alcohol | 5.0 wt % |
| | IPA (isopropylalcohol) | balance |

In this case, the pigment dispersion 3 used was the same as that of Example 3. The mixed solution prepared to have the above composition F was agitated for about one hour to cause a reaction, thus preparing a lower layer forming solution.

(2) Formation of antireflection film

By use of the solution B of Example 1 as an upper layer forming solution, an antireflection multilayer film was formed on a substrate. The coating method, the conditions, and the film thickness were as in Example 1. The composition of each layer of the two-layer antireflection film thus formed was as follows.

| Lower layer | TiO$_2$ | 55 wt % |
| --- | --- | --- |
| | pigment 2 | 11.25 wt % |
| | pigment 3 | 11.25 wt % |
| | pigment 4 | 11.25 wt % |
| | pigment 5 | 11.25 wt % |
| Upper layer | SiO$_2$ only | |

Figure 5B:
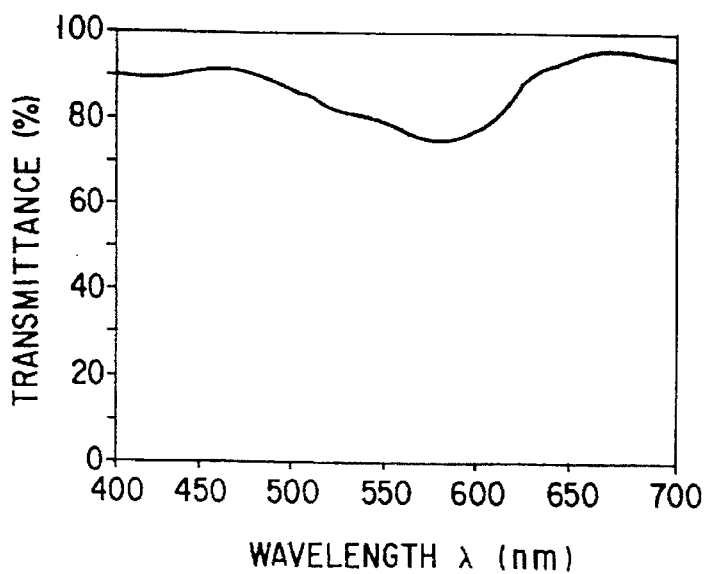
FIG. 5B is a graph showing the spectral transmittance characteristics of an antireflection multilayer film according to Example 5.

The spectral reflectance and spectral transmittance of the two-layer antireflection film obtained in this manner were measured, and the results were as shown in FIG. 5A and FIG. 5B. As is clear from the results, the antireflection film of this example exhibited an excellent antireflection effect, as in the case of the film of Example 1.

EXAMPLE 6

(1) Preparation of lower layer forming solution

First, a solution G having the following composition was prepared as a lower layer forming solution.

| G: | Si(OC$_2$H$_5$)$_4$ silicon tetraethoxide | 1.0 wt % |
| --- | --- | --- |
| | SnO$_2$-fine-particle dispersion | 14.4 wt % |
| | pigment dispersion 1 | 6.2 wt % |
| | HNO$_3$ (nitric acid) | 0.1 wt % |
| | water | 0.5 wt % |
| | IPA (isopropylalcohol) | balance |

In this case, the SnO$_2$ fine-particle dispersion was obtained by dispersing fine particles of SnO$_2$ having a size of about 50–100 nm in IPA at 2 wt %. The pigment dispersion 1 used was the same as that of Example 1. The mixed solution prepared to have the above composition G was agitated for about one hour to cause a reaction, thus preparing a lower layer forming solution.

(2) Formation of antireflection multilayer film

By use of the solution B of Example 1 as an upper layer forming solution, an antireflection film was formed on a substrate. The coating method, the conditions, and the film thickness were as in Example 1. The composition of each layer of the two-layer antireflection film thus formed was as follows.

| Lower layer | SiO$_2$ | 39.7 wt % |
| --- | --- | --- |
| | SnO$_2$ | 39.7 wt % |
| | pigment 1 | 20.5 wt % |
| Upper layer | SiO$_2$ only | |

Figure 6A:
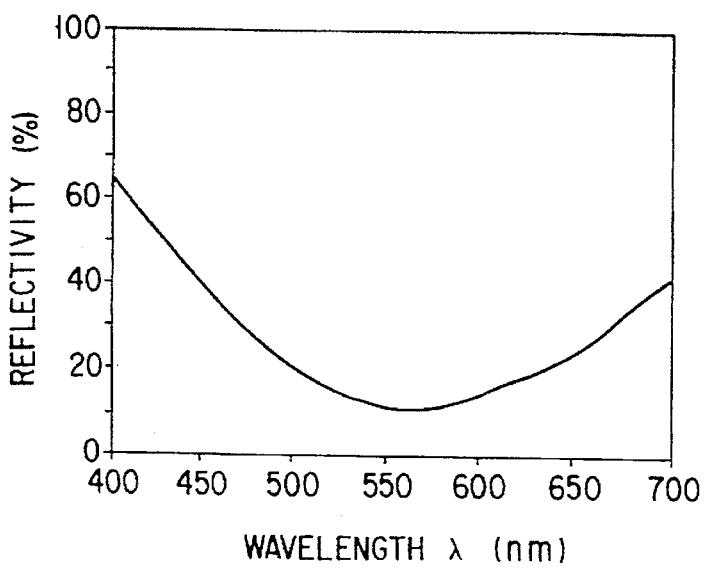
FIG. 6A is a graph showing the spectral reflectance of an antireflection multilayer film according to Example 6.
Figure 6B:
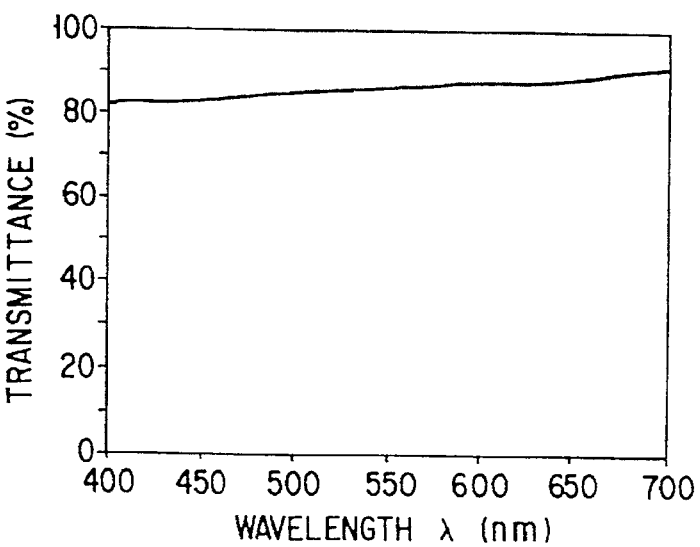
FIG. 6B is a graph showing the spectral transmittance characteristics of an antireflection multilayer film according to Example 6.

The spectral reflectance and spectral transmittance of the two-layer antireflection film obtained in this manner were measured, and the results were as shown in FIG. 6A and FIG. 6B. As is clear from FIG. 6A and FIG. 6B, the antireflection film of this example exhibited an excellent antireflection effect, as in the case of the film of Example 1. Further, this antireflection multi-layer film had a conductivity, and its resistance was $10 \times 10^{10}$ Ω/cm.

EXAMPLE 7

(1) Preparation of upper layer forming solution

First, a solution H having the following composition was prepared as a upper layer forming solution.

| H: | Si(OC$_2$H$_5$)$_4$ silicon tetraethoxide | 1.0 wt % |
| --- | --- | --- |
| | SnO$_2$-fine-particle dispersion | 14.4 wt % |
| | HNO$_3$ (nitric acid) | 0.1 wt % |
| | water | 0.5 wt % |
| | IPA (isopropylalcohol) | balance |

In this case, the SnO$_2$ fine-particle dispersion used was the same as that of Example 6. The mixed solution prepared to have the above composition H was agitated for about one hour to cause a reaction, thus preparing a upper layer forming solution.

(2) Formation of antireflection multi-layer film

By use of the solution G of Example 6 as a lower layer forming solution, an antireflection multi-layer film was formed on a substrate. The coating method, the conditions, and the film thickness were as in Example 1. The composition of each layer of the two-layer antireflection film thus formed was as follows.

| Lower layer | SiO$_2$ | 39.7 wt % |
| --- | --- | --- |
| | SnO$_2$ | 39.7 wt % |
| | pigment 1 | 20.5 wt % |
| Upper layer | SiO$_2$ | 50.0 wt % |
| | SiO$_2$ | 50.0 wt % |

The spectral reflectance and spectral transmittance of the two-layer antireflection film obtained in this manner were measured, and the results were as shown in FIGS. 7A and 7B. As is clear from the results, the antireflection film of this example exhibited an excellent antireflection effect, as in the case of the film of Example 1. This antireflection multi-layer film had a conductivity, and its resistance was $5 \times 10^8$ Ω/cm$^2$.

EXAMPLE 8

By use of solution B as a lower layer forming solution, solution A as a mid-layer forming solution, and solution B as an upper layer forming solution, an antireflection film having the three-layer structure was prepared. The coating method, the conditions, and the film thickness were as in Example 1. The spectral reflectance and spectral transmittance of the two-layer antireflection film obtained in this manner were measured, and the results were as shown in FIG. 8A and FIG. 8B. As is clear from the results, the antireflection film of this example exhibited an excellent antireflection effect in a region broader than that in the case of the film of Example 1.

EXAMPLE 9

By use of solution B as a lower layer forming solution, solution C as a mid-layer forming solution, and solution B as an upper layer forming solution, an antireflection film of the three-layer structure was prepared. The coating method, the conditions, and the film thickness were as in Example 1. The spectral reflectance and spectral transmittance of the two-layer antireflection film obtained were measured, the results being shown in FIGS. 9A and 9B. As is clear, the antireflection film of this example exhibited an excellent antireflection effect in a region broader than that in the case of the film of Example 2.

EXAMPLE 10

As another example of the display apparatus, the case in which the present invention is applied to a cathode ray tube will now be described.

FIG. 10 is a partially cutaway section showing a cathode ray tube 60 made according to the invention. The cathode ray tube has an airtight glass envelope 61 the interior of which is evacuated. The envelope 61 includes a neck 62 and a cone 63 continuously extended from the neck 62. In addition, the envelope 61 has a faceplate 64 sealed by a frit glass, An explosion-proof metal-made tension band 65 is wound around the periphery of the side wall of the faceplate 64.

An electron gun 66 for emitting electron beam is arranged in the neck 62. A phosphor screen 67 is formed on the inner surface of the faceplate 64. The phosphor screen 67 is constituted by a phosphor layer which is excited by electron beams from the electron gun 66 to emit light. A deflection unit (not shown), which serves to deflect electron beams to scan over the phosphor screen, is arranged outside the cone 63.

A lower layer forming solution and an upper layer forming solution of the above Examples 1 to 7 are coated on the outer surface of the faceplate 64 of the cathode ray tube 60, thus forming an antireflection multi-layer film 68 having a two-layer structure according to the present invention.

In Example 1, the lower layer forming solution and the upper layer forming solution were coated by the dip method; however in this example, they were coated by spin coating method on the front surface of the faceplate of the 25-inch color cathode ray tube after the completion of the assembly. The conditions for drying and calcination, and the thickness of each of the lower and upper layers were the same as those of Example 1.

Thus obtained antireflection film exhibited the characteristics shown in FIG. 1 to FIG. 7 of Examples 1 to 7. The cathode ray tube having the antireflection multi-layer film hardly suffered reflection of ambient light from a window, a lighting unit, and the like. In addition, since reflection light became colorless light, a good images were formed without deteriorating in color reproduction property.

It should be noted that the spectral reflectance of the antireflection multi-layer film formed on the surface of the color cathode ray tube was measured by MCPD-1000 available from Otsuka Electronics k.k. A halogen lamp was used as a light source to perform measurement at an incident angle of 0°. Then, a portion of the antireflection film was removed, and the reflectance of that portion was measured. The value was expressed with respect to that of the portion on which the antireflection film was removed assumed to be 100%. Also, the spectral transmittance was measured by a spectrocolorimeter CM-1000 available from MINOLTA CAMERA CO., LTD. Then, a portion of the antireflection multi-layer film was removed by a chemical, and another measurement was performed on that portion of the sample. The measurement value was expressed by the square root of the ratio of the value of the antireflection multi-layer film to the value of a portion on which antireflection multi-layer film was removed.

EXAMPLE 11

As another example of the display apparatus, the case in which the present invention is applied to a liquid crystal display will now be described.

FIG. 11 is a sectional view showing a liquid crystal apparatus manufactured on the basis of the present invention.

The liquid crystal apparatus includes a pair of opposing glass substrates 71 and 72, the gap between which is regulated by a spacer 77 made of thermosetting resin, and a liquid crystal 78 filled in the gap. Electrodes 73 and 74 having predetermined patterns and made of ITO (indium tin oxide) are formed on the opposing surfaces of the substrates 71 and 72, and orientation films 75 and 76 are formed on these electrodes 73 and 74. The peripheral portions of the glass substrates 71 and 72, between which the liquid crystal 78 is filled, are sealed by a sealing agent 79.

In the liquid crystal display apparatus having the above-described structure, an antireflection multi-layer film 80 is formed on the outer surface of the glass substrate 71. The antireflection multi-layer film 80 was formed as follows. After the peripheral portions of the substrates 71 and 72 were sealed by the sealing agent 79, the lower layer forming solution and the upper layer forming solution used in Example 3 were coated to have a thickness of 0.1 µm, followed by calcination. The antireflection multi-layer film 80 thus obtained exhibited an excellent antireflection property, as in the case of Example 3.

Although the present invention has been described with reference to the particular embodiments, the antireflection characteristics of an antireflection multi-layer film are to be properly set in accordance with characteristics required for a substrate on which the film is to be formed, and hence are not limited to those in the embodiments. In addition, combinations of antireflection films and display apparatus are not limited to those in the above embodiments.

As described, according to the present invention, the multi-layer antireflection film having an excellent antireflection property can be manufactured simply by adding pigments to at least one layer of a antireflection film of a multi-layer structure having two or more layers. Further, the present invention is industrially useful in terms of selectivity of film material, and strength of film.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An antireflection film arrangement having a multi-layer structure, comprising:

a substrate; and an antireflection multi-layer film including at least one odd numbered and at least one even numbered thin films formed on said substrate, said at least one odd numbered thin film being defined as each alternate thin film counting from an outermost thin film and said at least one even numbered film being defined as each alternate thin film counting from a second to outermost film;

wherein said at least one even numbered thin film contains a coloring material, wherein said at least one odd-numbered film is free of said coloring material, wherein said antireflection multi-layer film absorbs at least 5% of light in an entire range of wavelength of 400–700 nm, and wherein a reflectance of said antireflection multi-layer film with regard to said range of wavelength is smaller than a reflectance of said substrate.

2. An antireflection film according to claim 1, wherein said antireflection multi-layer film absorbs at least 10% of light in said entire range of wavelength of 400–700 nm.

3. An antireflection film according to claim 1, wherein said coloring material is at least one selected from the group consisting of carbon black and graphite.

4. An antireflection film according to claim 1, wherein the said coloring material absorbs light in said entire range of wavelength of 400–700 nm.

5. An antireflection film according to claim 1, wherein said thin films are made of one type selected from the group consisting of $SiO_2$, $TiO_2$, $ZrO_2$, $TaO_5$, and $Al_2O_3$.

6. An antireflection film according to claim 1, wherein said first and second thin films have the same composition.

7. An antireflection film according to claim 1, wherein said first and second thin films have different compositions.

8. A display apparatus including an antireflection film arrangement having a multi-layer structure, comprising:

a light-transmitting display substrate; and an antireflection multi-layer film including at least one odd numbered and at least one even numbered thin films formed on said substrate, said at least one odd numbered thin film being defined as each alternate thin film counting from an outermost thin film and said at least one even numbered film being defined as each alternate thin film counting from a second to outermost film;

wherein said at least one even numbered thin film contains a coloring material, wherein said at least one odd-numbered film is free of said coloring material, wherein said antireflection multi-layer film absorbs at least 5% of light in an entire range of wavelength of 400–700 nm, and wherein a reflectance of said antireflection multi-layer film relating to said range of wavelength is smaller than a reflectance of said substrate.

9. A display apparatus according to claim 8, wherein said display apparatus is a cathode ray tube.

10. A display apparatus according to claim 8, wherein said display apparatus is a liquid crystal display apparatus.

11. A display apparatus according to claim 8, wherein said antireflection multi-layer film absorbs at least 10% of light in said entire range of wavelength of 400–700 nm.

12. A display apparatus according to claim 8, wherein said coloring agent is at least one selected from the group consisting of carbon black and graphite.

13. A display apparatus according to claim 8, wherein said coloring material absorbs light in said entire range of wavelength of 400–700 nm.

14. A display apparatus according to claim 8, wherein said thin films are made of one type selected from the group consisting of $SiO_2$, $TiO_2$, $ZrO_2$, $TaO_5$, and $Al_2O_3$.

15. A display apparatus according to claim 8, wherein said first and second thin films have the same composition.

16. A display apparatus according to claim 8, wherein said first and second thin films have different compositions.

17. An antireflection film according to claim 1, wherein said at least one even numbered film has a high refractive index, and wherein said at least one odd numbered film has a low refractive index.

18. A display apparatus according to claim 8, wherein said at least one even numbered film has a high refractive index, and wherein said at least one odd numbered film has a low refractive index.

19. An antireflection film arrangement having a multi-layered structure, comprising:

a substrate; and an antireflection multi-layered film including at least two thin films formed on said substrate, a first of said at least two films being an outermost thin film and being an odd-numbered film;

wherein a second of said at least two thin films contains a coloring material, said second film being an even numbered film counting from said first outermost film, wherein odd-numbered films are free of said coloring material, and wherein said antireflection multi-layered film absorbs at least 5% of light in an entire range of wavelength of 400–700 nm.

20. An antireflection film arrangement according to claim 19, wherein at least one of said two thin films contains an electrically conductive material.

21. A display apparatus including an antireflection film arrangement having a multi-layered structure, said antireflection multi-layered film comprising:

at least two thin films, a first of said at least two films being an outermost thin film of said apparatus and being an odd-numbered film, a second of said at least two thin films containing a coloring material and being an even numbered film counting from said first outermost thin film, wherein odd-numbered films are free of said coloring material, and wherein said antireflection multi-layered film absorbs at least 5% of light in an entire range of wavelength of 400–700 nm.

22. A display apparatus according to claim 21, wherein at least one of said two thin films contains an electrically conductive material.

* * * * *